(12) United States Patent
Haizmann et al.

(10) Patent No.: US 12,411,595 B2
(45) Date of Patent: Sep. 9, 2025

(54) COMPUTER IMPLEMENTED METHOD FOR PILOTING A REMOTE DEVICE WITH A LOCAL DEVICE

(71) Applicant: TeamViewer Germany GmbH, Göppingen (DE)

(72) Inventors: Andreas Haizmann, Schlierbach (DE); Gautam Goswami, Tarzana, CA (US)

(73) Assignee: TEAMVIEWER GERMANY GMBH, Göppingen (DE)

( * ) Notice: Subject to any disclaimer, the term of this patent is extended or adjusted under 35 U.S.C. 154(b) by 0 days.

(21) Appl. No.: 17/409,500

(22) Filed: Aug. 23, 2021

(65) Prior Publication Data
US 2022/0057923 A1   Feb. 24, 2022

(30) Foreign Application Priority Data
Aug. 23, 2020 (EP) .................................. 20192289

(51) Int. Cl.
G06F 3/048    (2013.01)
G06F 3/04847  (2022.01)

(52) U.S. Cl.
CPC ................. G06F 3/04847 (2013.01)

(58) Field of Classification Search
None
See application file for complete search history.

(56) References Cited

U.S. PATENT DOCUMENTS

| | | | |
|---|---|---|---|
| 9,826,078 B2 | 11/2017 | Kim et al. | |
| 2006/0031779 A1* | 2/2006 | Theurer | G06F 3/1454 715/781 |
| 2013/0076764 A1* | 3/2013 | Yada | H04L 12/1827 345/520 |
| 2016/0119464 A1* | 4/2016 | Kim | G06F 3/0486 455/566 |
| 2017/0064572 A1* | 3/2017 | Subramanian | H04W 40/02 |
| 2017/0093450 A1* | 3/2017 | Xia | G06F 1/1677 |
| 2017/0109118 A1* | 4/2017 | Ady | G06F 3/04883 |
| 2018/0336373 A1 | 11/2018 | Deenadayal | |
| 2019/0364308 A1* | 11/2019 | Milford | H04N 21/236 |
| 2021/0162115 A1* | 6/2021 | Surine | G06F 3/0484 |
| 2021/0406806 A1* | 12/2021 | Sadowski | G06Q 10/063114 |

FOREIGN PATENT DOCUMENTS

EP    3013023 A1    4/2016

OTHER PUBLICATIONS

Search Report cited in corresponding European app No. 20192289. 5; Feb. 17, 2021; 8pp.

* cited by examiner

Primary Examiner — Tuan S Nguyen
(74) Attorney, Agent, or Firm — Lempia Summerfield Katz LLC

(57) ABSTRACT

A computer-implemented method for piloting a remote device with a local device comprises the steps of: a remote device with a first screen having a first size is provided; a local device with a second screen having a second size is provided, wherein the second size is larger than the first size; defining a position and a size of an area on the second screen based on the size of the first screen, the area being smaller than the second screen; and displaying the area of the second screen of the local device on the first screen of the remote device.

20 Claims, 4 Drawing Sheets

COMPUTER IMPLEMENTED METHOD FOR PILOTING A REMOTE DEVICE WITH A LOCAL DEVICE

RELATED APPLICATION DATA

This application claims priority to and the benefit of European national application no. 20192289.5 filed on Aug. 23, 2020, the entire content of which is hereby incorporated by reference herein.

BACKGROUND OF THE INVENTION

1. Field of the Invention

The present invention relates to piloting a remote electronic device like a smartphone, a handheld tablet computer, smart glasses, or the like, with a local electronic device having a bigger screen, like a desktop personal computer.

2. Description of the Prior Art

Mobile devices such as smartphones, tablets, smart glasses, or the like are used more and more in industrial applications. The mobile devices are easy to handle and have gained remarkable graphics processing power and storage capacities. Possible industrial application scenarios are for example a hands-on technician servicing high-tech machines in manufacturing plants or a contractor supervising a construction site. In both cases, data required for the respective job may be stored on the remote electronic device. However, for solving unexpected problems the technician or the contractor may be required to request assistance from his/her main office.

For this case, existing products for remotely accessing local devices allow users to remotely control the local device, e.g. a desktop computer. To this end, the user installs on both the remote device and the local device a program or app. The programs or apps on the remote device and the local device communicate with each other and allow the user to see and access files and applications provided on the local device. Therefore, the screen of the remote device shows the content of the screen of the local device. User actions performed by a user on the remote device are performed on the local device.

In this context, it is still problematic that the remote device has a substantially smaller display than the local device. For example, whereas the mentioned kind of remote device like a smartphone has a typical screen size (diagonal) of 4" to 6", PCs, laptops, or the like have screen sizes of 13" or larger. Usually, the operating system on the local device and all applications running thereon are designed to operate according to the screen size of the monitor that is present at the local device, which is usually a desktop monitor. The physical screen size of a desktop monitor is substantially bigger than that of a remote device like a smartphone, a tablet, or smart glasses. In this context, it is to be noted that it is in most cases not the pixel density (ppi or dpi), i.e. the pixels per area, or the resolution of a screen, i.e. the total number of pixels available on a screen, which determines whether a user can read text or to correctly interpret a drawing. The pixel density available today on remote devices like smartphones is in the range of 300-500 dpi and as such higher than that of a desktop monitor. The resolution of nowadays remote devices is in the range of 1080×1900 pixels or higher and is in the same range as that of a desktop monitor.

Further, on remote devices usually only a touch screen or voice commands are available as a source for inputting user actions. Given the small physical size of a remote device, it is often difficult for the user to access the required information, to display it correctly, and at the same time to perform the required tasks.

Therefore, in situations in which the screen of the remote devices smaller than the screen of the local device and the user of the remote device has to access information stored on the local device, the applications and configurations presently available have the above-mentioned drawbacks

SUMMARY OF THE INVENTION

It is an object of the present invention to provide a computer-implemented method for providing information from a local device to a remote device in cases in which the screen of the remote device is smaller than the screen of the local device. In particular, it is an object to improve the user experience in the above-mentioned scenarios.

In accordance with the present invention, this object is achieved by a computer-implemented method for piloting a remote device with a local device, the method comprising the steps:
  a) a remote device with a first screen having a first size is provided;
  b) a local device with a second screen having a second size is provided, wherein the second size is larger than the first size;
  c) setting a position and/or a size of an area on the second screen based on a user action performed on the local device, the area being smaller than the second screen;
  d) displaying the screen content of the area of the second screen of the local device on the first screen of the remote device.

The method allows a person using the local device, e.g. a desktop computer, to pilot the remote device, e.g. a smartphone or smart glasses, by defining an area of the second (local) screen and displaying the screen content of the same on the first (remote) screen.

The screen size of the second screen is larger than the screen size of the first screen, preferably at least by a factor of 1.5, more preferred at least by a factor of 2, most preferred at least by a factor of 3 in screen size (diagonal).

This is especially beneficial in the field of remote assistance where an expert using the local device is supporting another person using the remote device. In this situation, there is often a need to share data from the expert side to the person in the field. The data could be live IoT ("Internet of Things") telemetry data of a machine being under service, a manufacturing drawing, a room plan, an electrical circuit plan, or any other kind of data from the expert's device. The expert has full control over what he/she wants to share from his/her screen since the position and the size of the area to be shared is set on the second screen based on a user action performed on the local device and corresponds to the aspect ratio of the remote device. This can be, e.g., defining the position and/or the size of the area on the second screen by hitting a mouse button or a soft button, moving around the window that defines the shared part of the screen with a mouse/finger touch. This means the user of the local device has full control over which data of the second (local) screen is shared. So, no sensitive data—which may be not be related to the problem or which may be confidential—is shared.

On the side of the remote device, the user thereof does not have to interact with the shared screen content of the first (remote) screen. Since the user of the second (local) screen determines which data is visible on the first (remote) screen, it is always the relevant data that is visible on the first (remote) screen. The user of the remote device can focus on the task he is presently trying to achieve. This is in particular beneficial for any hands-free application since the user of the remote device can use both hands to solve the issue.

Preferably, a voice transmission channel between the remote device and the local device is provided. This allows to transmit voice data from the local device to the remote device. For example, the user of the remote device may ask questions and the user of the local device may provide spoken answers via the voice transmission channel.

The invention may also be beneficial in other use cases like online collaboration applications or the like.

Preferably, the screen content of the area displayed on the first (remote) screen covers the first screen. In particular, the screen content of the area covers the first screen completely. This makes optimum use of the first (remote) screen and it prevents the user of the remote device from trying to make entries.

In a preferred embodiment, the method comprises the step of providing information concerning the remote device and/or the local device. If the local device has information concerning the remote device, the size and the position of the area on the second (local) screen may be adapted to the requirements of the remote device. In particular, it is the aspect ratio of the remote device screen displayed of the second device that makes it seamless for the person in the field with the smart glasses on or with the mobile device. In addition, by visually seeing the visual feedback, the person in the local device has a very good understanding what the person in the field is actually seeing and looking at.

The information may comprise, for example, the physical size of the first screen and/or the second screen, the scaling factor of the first screen and/or the second screen, the orientation of the first screen, the aspect ratio of the first screen, and/or the use case of the remote device and/or the local device.

In particular, the local device may be adapted to calculate the area size and/or the position of the area on the second screen based on the information concerning the remote device, in particular according to the aspect ratio of the first screen. For example, the physical size of the first screen for a smartphone may be larger than the physical size of the first screen of a pair of smart glasses. However, due to the different use case (smartphone/glasses), the local device may assume a different distance between the first screen and the user's eyes and may choose a different size of the area on the second (local) screen, accordingly.

In a preferred embodiment, the second screen provides visual feedback on the size and/or position of the area. The visual feedback may be a frame surrounding the area on the second screen to be displayed on the first screen. The frame may be highlighted by a certain color, by inverting the colors underlying the frame, or the like.

In a preferred embodiment, the method comprises transmitting a piloting request between the remote device and the local device and/or establishing a transmission channel between the remote device and the local device. This allows the user of the local device to bring the remote device into the piloting mode in which the first (remote) screen is fully controlled by the screen content of the area of second (local) screen and to transmit the necessary data from the local device to the remote device.

In particular, the step of displaying comprises sending the screen content of the area of the second screen to the remote device. This may be done by the established transmission channel between the remote device and the local device.

In a preferred embodiment, the step of setting the position and the size of the area comprises requesting feedback from a user concerning the position and/or size of the area. In particular, the local device may request permission from the user of the local device to set the position and/or to display the screen content of the area of the second screen on the first screen of the remote device. This may be in particular relevant if the second screen comprises content that is confidential and shall not be provided to the user of the remote device. Additionally or alternatively, the user may define a confidential area on the second screen that may not be transmitted to the remote device and be displayed on the first (remote) screen.

In a preferred embodiment, a user-input on the local device and/or the remote device is displayed on the other device, respectively. The user input may be, for example, a drawing or a highlighting drawn on the respective screen, for example for indicating relevant content, a direction or the like.

In an embodiment, the screen content of the second screen is displayed at least partially on the first screen of the remote device. For example, the content is displayed only in outlines and/or transparent or semi-transparent and may be mixed with real-time video content of the remote device.

Subject of the invention is also a data processing system comprising a remote device having a first screen, a local device having a second screen, wherein the second screen is larger than the first screen, and means for carrying out the following steps:
  setting a position and/or the size of an area on the second screen based on the use of action performed in the local device, the area being smaller than the second screen;
  displaying the screen content of the area of the second screen of the local device on the first screen of the remote device.

Subject of the invention is also a computer program comprising instructions which, when the program is executed on a local device, cause the local device to carry out the following steps.
  a) based on the size of a first screen of a remote device, setting a position and/or a size of an area on a second screen of the local device based on a user action performed on the local device, the area being smaller than the second screen;
  b) displaying the area of the second screen of the local device on the first screen of the remote device.

Subject of the invention is also a non-transitory or transitory computer-readable medium, comprising instructions stored thereon, that when executed on a processor of a local device, perform the steps of:
  a) based on the size of a first screen of a remote device, setting a position and/or a size of an area on a second screen of the local device based on a user action performed on the local device, the area being smaller than the second screen;
  b) displaying the area of the second screen of the local device on the first screen of the remote device.

A transitory computer-readable medium may be a random access memory (RAM), while non-transitory computer-readable mediums comprise hard disk drives or solid-state drives of a server or other computer, optical disks, read-only memories or flash memories.

Definitions

The term "device" is used herein to denote an electronic device having a processing unit and a user interface.

Examples of such devices include servers, desktop or portable computers, PDAs, tablets, television sets, gaming consoles, and various mobile devices such as smartphones or smart glasses.

The term "screen" as used herein includes any type of cathode-ray tube, liquid crystal display, e-ink display, projection screens, displays in VR headsets, or smart glasses.

The term "user action" is used herein to denote any type of action that the user may perform to control an electronic device. Such user actions include
  moving a mouse,
  hitting the key of a mouse, of a keyboard, or of any other peripheral input device,
  gestures on a touch-sensitive screen,
  spoken utterance,
  gestures made to the part of the human body, e.g. gestures made with the arms, the head, the eyelids, or the iris.

The term "piloting" is used herein to describe the fact that the local device is temporarily sharing the screen of the local device with the remote device without any input from the remote device.

BRIEF DESCRIPTION OF THE DRAWINGS

Various features and advantages of the present invention may be more readily understood with reference to the following detailed description taken in conjunction with the accompanying drawings in which.

DETAILED DESCRIPTION OF PREFERRED EMBODIMENTS

Figure 1:
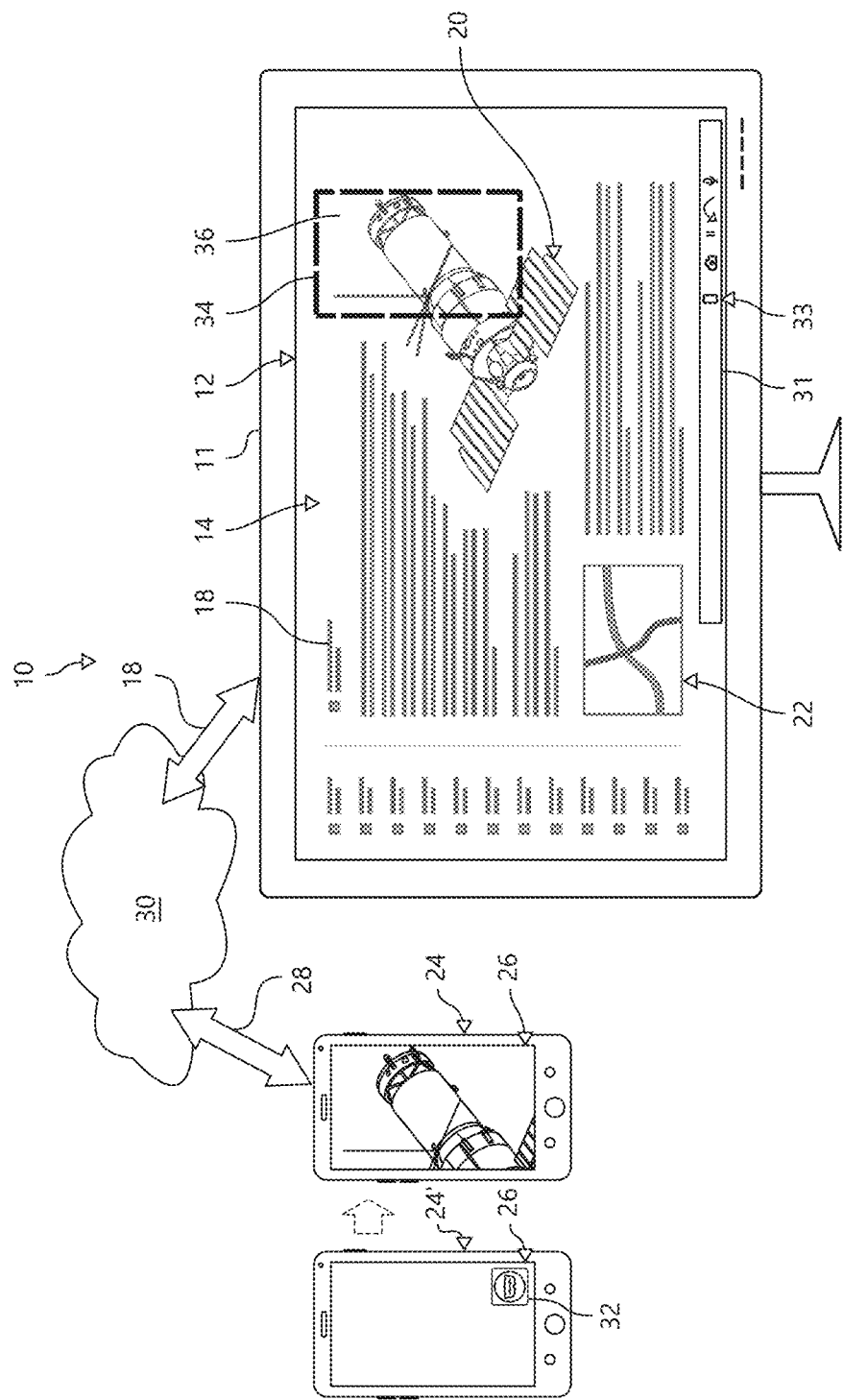
FIG. 1 shows a smartphone being piloted by a desktop computer, the smartphone being oriented in a vertical direction and displaying an area of the desktop computer's screen.

FIG. 1 shows on the right-hand side a desktop computer 10 having a monitor 11 with a screen 12. On the screen 12 content 14 is displayed. The content 14 exemplarily comprises several lines of text 18, technical drawing 20, and a map 22. As a matter of course, the content 14 may be of any kind and may also comprise photographs or video content. The desktop computer 10 comprises the usual input means, e.g. a keyboard, a mouse, and may also have a touch-sensitive monitor (not shown).

On the left-hand side of FIG. 1, a smartphone 24, 24' having a touch screen 26 is shown in two different modes. Of course, instead of the smart phone 24 also smart glasses could be used. Both the smartphone 24, 24' and desktop computer 10 have a processing unit, a non-transitory memory, and a power supply. The smartphone 24 usually is equipped with a rechargeable battery (not shown).

Both on the desktop computer 10 and the smartphone 24 an application 31, 32 is installed and stored in the respective memory. Instead of an application the system could also run browser-based, at least on the desktop computer side.

The application on the desktop computer 10 is symbolized by a rectangle 31. On the smartphone, the application is symbolized by an app icon 32.

On the desktop computer, the app 31 is put in the pilot mode by pressing a soft button 33.

On the smartphone 24', the pilot mode is activated by pressing the app icon 32. Alternative or additionally, the pilot mode may be activated on the smartphone 24' by pressing a soft button within another app already running. When the pilot mode is activated on the smartphone 24', the content of the display 26 changes. This is shown by the right hand side smartphone 24. The content of the display 26 of the remote device (smartphone 24) shows in the pilot mode only content received from the local device 10.

When the applications 31, 32 are running, a communication channel between the desktop computer and the smartphone is established. To this end, a server typically assigns a unique ID to both devices 10, 24. When a user of the desktop computer 10 enters the ID of the smartphone 24 into the application 32, the server establishes an encrypted communication channel 28 between the two devices 10, 24 via a network 30. After establishing the communication channel 28, the server withdraws its active participation so that the devices 10, 24 communicate directly with one another.

The present invention specifically addresses the situation in which the remote device—in this case the smartphone 24—has a substantially smaller screen 26 than the local device—in the presently described embodiment the screen 12 of the desktop computer 10, in particular of the monitor 11. It is intended to improve the usability when sharing information from the local device 10 to the remote device 24 so that the person receiving the information and using the remote device 24 does not have to interact with the data received and the person who is sharing the data and is using the local device 10 can choose which data is shared.

On the screen 12 of the monitor 11, the application 31 enters the pilot mode by pressing the soft button 32. When the user presses the soft button 32, the application 31 provides the user a frame 34 on the screen 12. The frame 34 surrounds an area 36 covering a certain part of the screen 12.

The size of the frame 34 is determined by the size of the screen 26 of the smartphone 24, 24', in particular its aspect ratio. In this context, the relevant information is the actual physical size of the screen 26. Other information concerning the smartphone 24 may be provided additionally or alternatively to the desktop computer 10, e.g. the aspect ratio of the screen 26, the model type of the smartphone 20, the resolution of the screen 26, the ppi (or dpi) of the screen 26, or the graphics/video capabilities of the smartphone 24.

With one of the above mentioned information, some of them or all of them, the application 31 running on the desktop computer 10 calculates an initial shape and size for the area 36 and prompts the user with the frame 34. The user of the desktop computer may then select the initial position of the frame 34 on the screen 12 and initiate the first transmission of the screen content 14 of the area 36 to the smartphone 24. This makes sure that the user of the desktop computer 10 is in full control of the screen content 14 that is provided to the user of the smartphone 24.

At the same time, the smartphone 24' enters the pilot mode, in which the screen 26 of the smartphone 24 only displays the screen content of the area 36 of the screen 12. The size of the area 34 is actively selected such that the screen 26 of the smartphone 24 can be covered entirely. Also, it may be advantageous if some, all, or all except one (or except a few) input commands on the smartphone 24 are disabled during the pilot mode. This allows for the user of the smartphone 24 to handle the smartphone without to worry about making an unwanted entry on the smartphone 24 and possibly leaving the pilot mode.

For example, the touch functionality of the screen 26 may be disabled and only a physical input button like a home button or the like may be active for ending the pilot mode.

Alternatively or additionally, the user of the remote device may only end the pilot mode by entering a certain end command, e.g. a double tap on the touch screen 26.

Alternatively, the user of the remote device 26 is not able to enter any commands to end the pilot mode. The ending of the pilot mode may in this case only be initiated by the local device 10.

After establishing the transmission channel 28 and transmitting the screen content of the area 36 to the smartphone's screen 26, the screen content of the area 36 is analyzed permanently by the desktop computer 10. If the content changes, the screen content of the area 36 is re-transmitted to the smartphone 24 and the screen 26 of the smartphone 24 is refreshed. Alternatively or additionally, the content is re-transmitted to the smartphone 24 in certain time intervals. Preferably, the system is operating as a real-time sharing system.

For ending the pilot mode, usually the user of the local device end the pilot mode by entering a respective commend. Alternative or additionally, the user of the smartphone 24 may either press a certain button, e.g. the home button, or may use any other command (e.g. voice command) that the application running on the smartphone 24 recognizes. Alternatively, the application running on the smartphone 24 may block any inputs from the (remote) user. In this case, the piloting mode may only be released by a user-action from the user of the local device.

Figure 2:
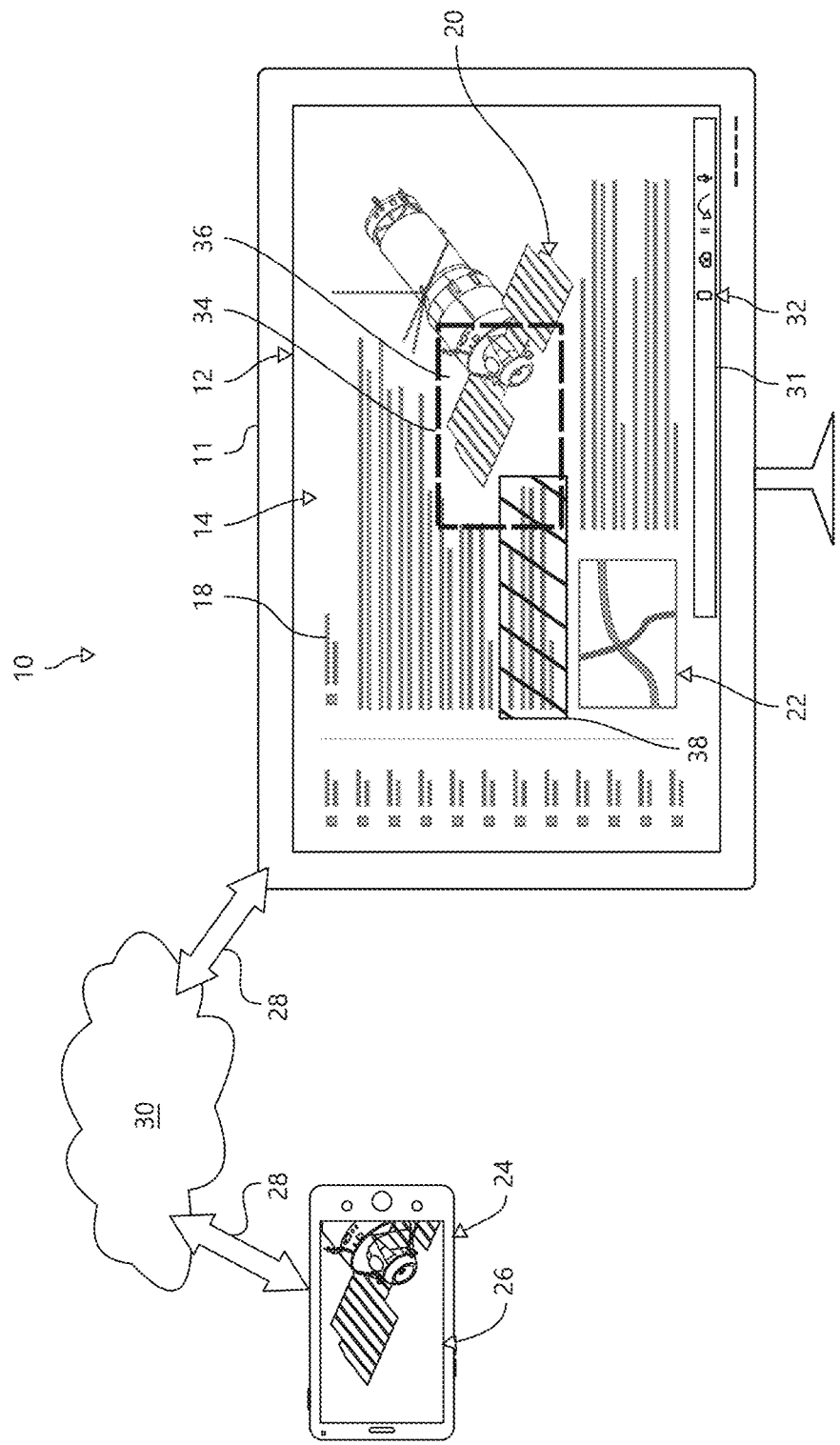
FIG. 2 shows the smartphone of FIG. 1 oriented in a horizontal direction.

FIG. 2 shows the smartphone 24 of FIG. 1 oriented in a horizontal direction. For the transmission of the screen content of the area 36 from the local device 10 to the remote device 24 different security settings may apply.

In a first usability setting, all content of the screen 12 may generally be allowed for transmission from the screen 12 of the local device 10 to the remote device. In this case, also the rotation function of the remote device 24 for tilting the display 26 from portrait view to landscape view may be generally be active and result in a tilting of the frame 36 on the local screen 12.

In a second high security setting, some parts of the screen 12 of the local device 10 may be blocked for transmission. For example, certain areas of the screen 12 may be blocked by defining the areas to be blocked. In the embodiment shown in FIG. 2, a text area 38 is defined as being not intended for transmission. This area 38 is not transmitted, even when the area 36 overlaps the area 38. Alternatively or additionally, only certain areas of the screen 12 may generally be allowed for transmission (not shown).

Alternatively or additionally, in the high security setting, the rotation function of the remote device 24 for tilting the display 26 from portrait view to landscape view may be generally be deactivated. Alternatively, the reproduction of the tilting operation of the remote device 24 on the local device 10 may depend on a release on the local device. For example, the user of the local device 10 may be prompted with a "tilt request" form the remote device 24 and may grant the request or not. In this context, the possible result of the tilting operation on the local screen may be indicated before executing the tilt.

Figure 3:
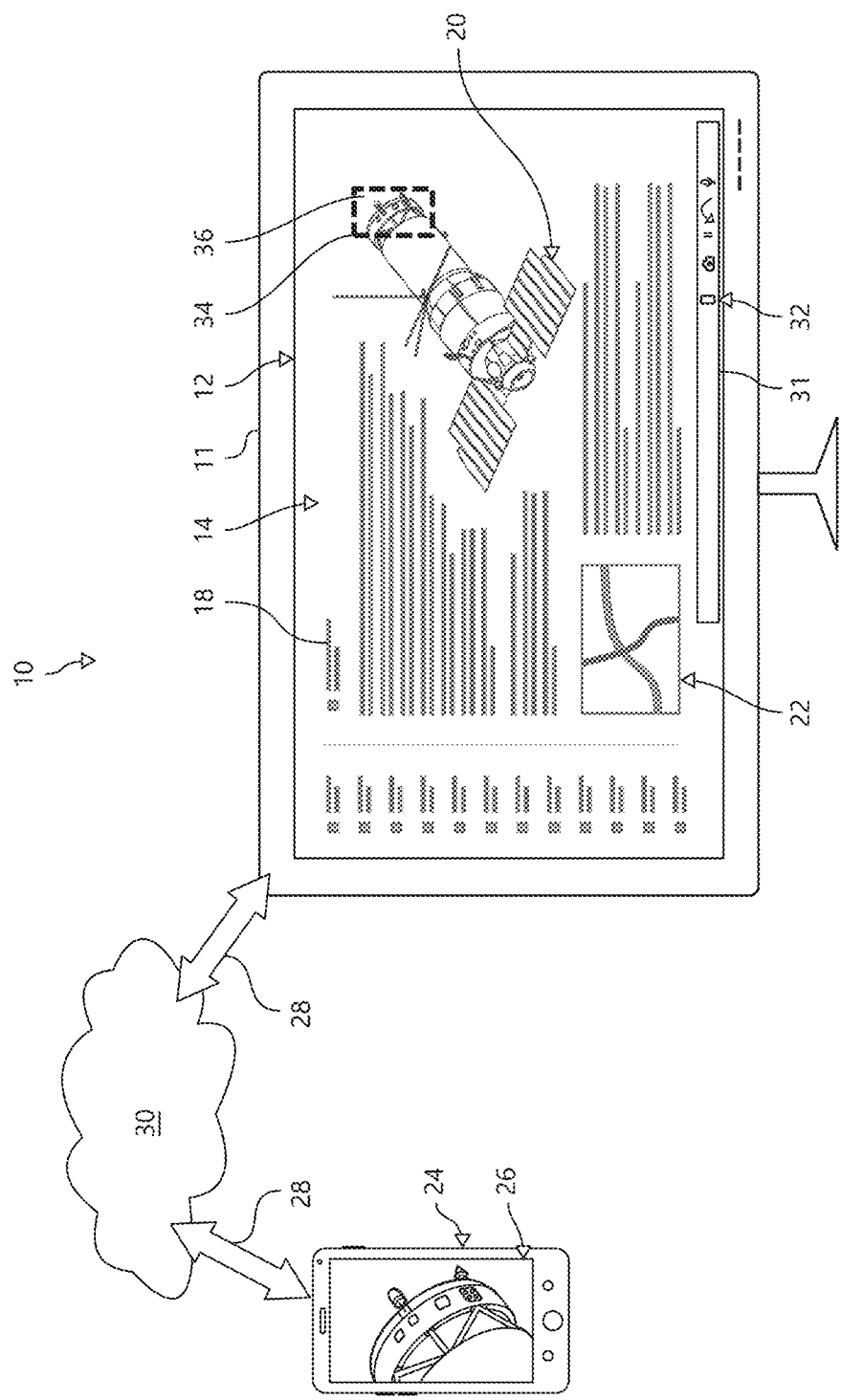
FIG. 3 shows the smartphone of FIG. 1 displaying a different area of the desktop computer's screen.

FIG. 3 shows the smartphone 24 of FIG. 1 displaying a different area of the desktop computer screen. As shown, it is possible on the local device, i.e. the desktop computer 10, to change the actual size of the frame 34. In FIG. 3, the frame's size has been reduced to provide the remote device 24 a magnification of a detailed drawing. Vice versa it is also possible to enlarge the size of the frame 34 to provide the remote device 24 with a better overview. However, at all times the aspect ratio of the remote screen 26 is maintained to make sure that the entire screen 26 is used for displaying the content of the area 36. This also helps to focus the user of the remote device 24 by not providing an distracting soft buttons or the like.

Figure 4:
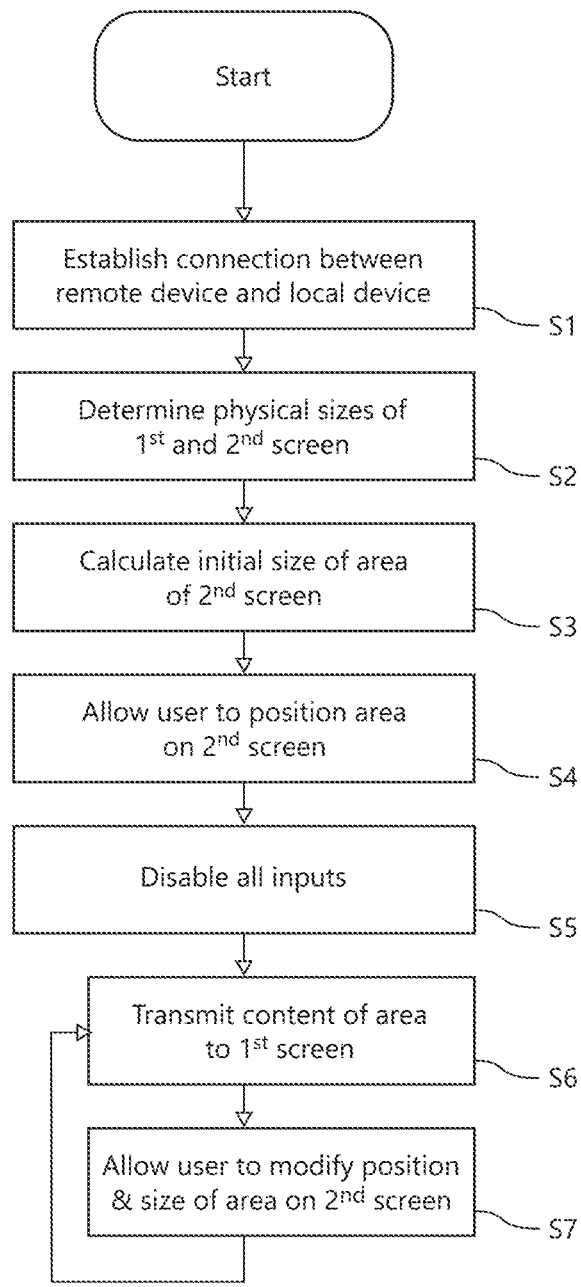
FIG. 4 is a flow diagram illustrating relevant method steps in accordance with the present invention.

FIG. 4 is a flow diagram illustrating relevant method steps in accordance with the present invention.

In a first step (S1), a connection between a remote device having a first screen and a local device having a second screen is established. This may involve a server that establishes the connection.

After establishing the connection, the sizes of the participating first and second screens are determined (S2). This may involve determining at least one of the following parameters of the remote device: the aspect ratio, the physical size, the model type, the resolution, and/or the dpi (or ppi).

From this information, the local device calculates the initial size of a frame/area on the second screen (S3). The frame determines the content to be transmitted and displayed on the first screen. The shape and size of the frame is adapted to the shape and size of the remote screen. The frame is usually rectangular and has the same aspect ratio as the first screen.

The local device has to determine where the frame is positioned on the second screen (S4). Depending on the security settings, the local device places the frame on a predetermined position on the second screen and begins to transmit the content within the frame to the remote device. Alternatively, if the security settings indicate that some of the content of the second screen is confidential and shall not be transmitted to the remote device, the local device may require a user action. For example, the user may confirm the predetermined position of the frame or correct the position of the frame before starting the transmission.

Alternatively or additionally, the local device may have information concerning confidential content on the screen and may avoid placing the frame on confidential areas. Alternatively or additionally, the frame may hide confidential content by excluding the confidential content from transmission.

After establishing the connection between the remote device and the local device user inputs from the remote device are disabled or reduced to a minimum (S5). On a smartphone, for example, the touchscreen may be disabled, or the acceptance of inputs thereof is reduced to a certain area or to a certain type (e.g. double tap).

If the security settings are low, the remote user may be allowed to perform pan or zoom actions.

If the touchscreen of the smartphone is disabled, other input means may be considered to end the pilot mode, e.g. pressing the home button, the volume up/down button, or other input means like voice command, shaking the smartphone, etc.

When the position and size of the area to be transmitted is determined, the local device transmits the content of the area to the remote device (S6).

The transmission is repeated when the content of the frame changes, e.g. when the user of the local device changes position and/or size of the area (S7). Alternatively or additionally, the content of the area my change naturally, because, for example, a video is playing (partially) in the area. Also the content may be re-transmitted according to time considerations. In any case, the transmission of the screen content shall be in real time.

The invention claimed is:

1. A computer-implemented method for piloting a remote device with a local device, the method comprising the steps:
   a) providing a remote device with a first screen having a first size;
   b) providing a local device with a second screen having a second size, wherein the second size is larger than the first size;
   c) setting a position and/or a size of an area on the second screen based on a user action performed on the local device, the area being smaller than the second screen;
   d) displaying screen content of the area of the second screen of the local device on the first screen of the remote device; and
   e) after establishing a connection between the remote device and the local device, disabling a touch screen function, or reducing the touch screen function to a certain area, or limiting a type of touch screen input to a certain input type on the remote device.

2. The method of claim 1, wherein the screen content of the area covers the first screen.

3. The method of claim 1, wherein the second screen provides a visual feedback on the size and/or position of the area.

4. The method of claim 1, further comprising the step of:
   transmitting a piloting request between the remote device and the local device and/or establishing a transmission channel between the remote device and the local device.

5. The method of claim 1, wherein the step of displaying comprises sending the screen content of the area of the second screen to the remote device.

6. The method of claim 1, wherein the step of defining comprises requesting a feedback from a user concerning the position and/or size of the area.

7. The method of claim 1, wherein a user-input on the local device and/or the remote device is displayed on the other device, respectively.

8. The method of claim 1, further comprising the step of:
   f) providing a voice transmission channel between the remote device and the local device.

9. The method of claim 1, wherein, in a step f), a blocked portion of screen information of the second screen is a part of the screen content of the area, and wherein, in a step g), the blocked portion of the screen content of the area is prevented from being displayed on the first screen of the remote device.

10. The method of claim 9, wherein, in step g), the blocked portion of the screen content is prevented from being transmitted to the first screen of the remote device.

11. The method of claim 1, further comprising the step of:
    f) selectively manipulating the size of the area of the second screen of the local device whereby the size of the screen content displayed on the first screen of the remote device is selectively increased or decreased accordingly.

12. The method of claim 1, further comprising the step of:
    f) providing information concerning the remote device and the local device.

13. The method of claim 12, further comprising the step of:
    g) calculating the area size and/or position of the area on the second screen based on the information concerning the remote device.

14. The method of claim 12, wherein the information comprises the physical size of the first screen and the second screen, and comprises one or more of the scaling factor of the first screen and/or the second screen and/or the use case of the remote device and/or the local device.

15. A data processing system comprising:
    a remote device having a first screen; and
    a local device having a second screen,
    wherein the data processing system is configured to carry out the steps of method claim 1.

16. A computer program stored on a local device and comprising instructions which, when the computer program is executed on a processor of the local device, cause the local device to carry out the following steps:
    a) based on the size of a first screen of a remote device, defining a position and a size of an area on a second screen of the local device, the area being smaller than the second screen;
    b) displaying screen content of the area of the second screen of the local device on the first screen of the remote device; and
    c) after establishing a connection between the remote device and the local device, disabling a touch screen function, or reducing the touch screen function to a certain area, or limiting a type of touch screen input to a certain input type on the remote device.

17. The computer program of claim 16, wherein, when the computer program is executed on a processor of the local device, the instructions further cause the local device to carry out the step of:
    d) providing a voice transmission channel between the remote device and the local device.

18. The computer program of claim 16, wherein, in a step d), a blocked portion of screen information of the second screen is a part of the screen content of the area, and wherein, in a step e), the blocked portion of the screen content of the area is prevented from being transmitted to the first screen of the remote device.

19. A non-transitory computer-readable medium, comprising instructions stored thereon that, when executed on a processor of a local device, cause the local device to perform the steps of:
    a) based on the size of a first screen of a remote device, defining a position and/or a size of an area on a second screen of the local device, the area being smaller than the second screen;
    b) displaying screen content of the area of the second screen of the local device on the first screen of the remote device; and
    c) after establishing a connection between the remote device and the local device, disabling a touch screen function, or reducing the touch screen function to a certain area, or limiting a type of touch screen input to a certain input type on the remote device.

20. The non-transitory computer-readable medium of claim 19, wherein, when executed on the processor of the local device, the instructions further cause the local device to perform the step of:
    d) providing a voice transmission channel between the remote device and the local device.

* * * * *